United States Patent
Gemignani, Jr. et al.

(10) Patent No.: US 9,503,353 B1
(45) Date of Patent: Nov. 22, 2016

(54) DYNAMIC CROSS PROTOCOL TUNER

(71) Applicant: EMC Corporation, Hopkinton, MA (US)

(72) Inventors: John Gemignani, Jr., Bremerton, WA (US); Daniel Sledz, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 141 days.

(21) Appl. No.: 14/585,939

(22) Filed: Dec. 30, 2014

(51) Int. Cl.
    *G06F 15/173* (2006.01)
    *H04L 12/26* (2006.01)
    *H04L 12/911* (2013.01)

(52) U.S. Cl.
    CPC ............... *H04L 43/18* (2013.01); *H04L 47/70* (2013.01)

(58) Field of Classification Search
    USPC ................ 709/224, 223, 236, 238, 231, 232
    See application file for complete search history.

(56) References Cited

U.S. PATENT DOCUMENTS

| | | | | |
|---|---|---|---|---|
| 7,711,844 B2 * | 5/2010 | Schuehler | ............... | H04L 43/18 709/223 |
| 8,224,902 B1 * | 7/2012 | Glasser | ................... | H04L 51/12 709/206 |
| 2004/0010612 A1 * | 1/2004 | Pandya | ................... | H04L 29/06 709/230 |
| 2014/0337321 A1 * | 11/2014 | Coyote | ................. | G06F 3/0482 707/722 |
| 2015/0178052 A1 * | 6/2015 | Gupta | ....................... | G06F 8/34 717/105 |

* cited by examiner

*Primary Examiner* — Jude Jean Gilles
(74) *Attorney, Agent, or Firm* — Krishnendu Gupta

(57) ABSTRACT

Implementations are provided herein for dynamically tuning resource allocation within a node among a cluster of nodes of a distributed file system. Each node can have a plurality of protocol heads that enable the node to communicate with clients using varying protocols. As tasks are received by the node from the client through the protocol head, the amount of work required to perform the task can be estimated, the amount of resources consumed by the task can be estimated, the amount of kernel memory required to perform the task can be estimated, and the amount of general memory required to perform the task can be estimated. Using these estimations, tasks can be scheduled by a scheduler based on the most efficient means to concurrently process as many tasks as possible using available resources of the node. In addition to efficiently scheduling tasks by the scheduler, a dynamic tuner can also reside on the node that can monitor all work executing on the node for each protocol head. The tuner can then distribute and, over time, redistribute resources to each protocol head using real-time data to make adjustments. In addition to tuning resources allocated to the protocol heads, the tuner can also account for pending and scheduled system task activity, as well as account for misbehaving clients.

20 Claims, 7 Drawing Sheets

DYNAMIC CROSS PROTOCOL TUNER

FIELD OF THE INVENTION

This invention relates generally to processing data, and more particularly to systems and methods for dynamic cross protocol tuning of nodes within a distributed file system.

BACKGROUND OF THE INVENTION

Distributed file systems offer many compelling advantages in establishing high performance computing environments. One example is the ability to easily expand, even at large scale. One example of a scalable distributed file system is a cluster of nodes. Individual nodes among the cluster of nodes each can contain their own processor(s), storage drives, memory and the like. Operating together in a cluster, the nodes can respond to client requests, store data, mirror data, and accomplish all the tasks of a modern file system. In communicating with clients, a distributed file system of nodes can support multiple protocol interactions. For example, some clients may want to communicate using NFS protocols, while other clients may desire SMB protocol exchanges to store/retrieve data, while still other clients may use HDFS. To support multiple clients using multiple protocols, protocol heads can be established on each node that act as a gateway for all clients using the protocol to interact with the file system.

For a node that supports multiple protocols, it may be necessary to provision resources to each of the protocol heads for use in processing transactions requested by the client. For example, a node with three protocol heads may divide resources like memory, processor(s), storage devices, etc. among the three protocol heads evenly. However, as one protocol head serves mores clients or is instructed to perform more operations than other protocol heads, it may be more efficient to dynamically provision resources to the protocol heads based on their dynamic use of the resources. In addition, system tasks such as file system maintenance, data mirroring, backup, and countless other processes may also be competing for resources as well. Thus, there exists a need dynamically tune resource allocation within the nodes of a distributed file system

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a hardware profile associated with a node among a cluster of nodes can be determined. A set of node resources can be determined based on the hardware profile. Resources among the set of resources can be assigned to protocol heads among a set of protocol heads. Activity by the protocol heads among the protocol heads can be monitored. Resources among the set of resources can be dynamically reassigned to protocol heads among the set of protocol heads based on the monitoring.

In accordance with an aspect, notice can be received from a jobs engine on scheduled system task activity, wherein the dynamically reassigning resources among the set of resources to protocol heads among the set of protocol heads is further based on the scheduled system task activity.

In accordance with an aspect, a set of clients associated with a protocol head among the set of protocol heads can be determined. Activity by the set of clients can be monitored. A client among the set of clients can be dynamically throttled, wherein the throttling includes at least one of delayed scheduling of the client's jobs, instructing the client to delay requests to the node, or disconnecting the client from the node.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
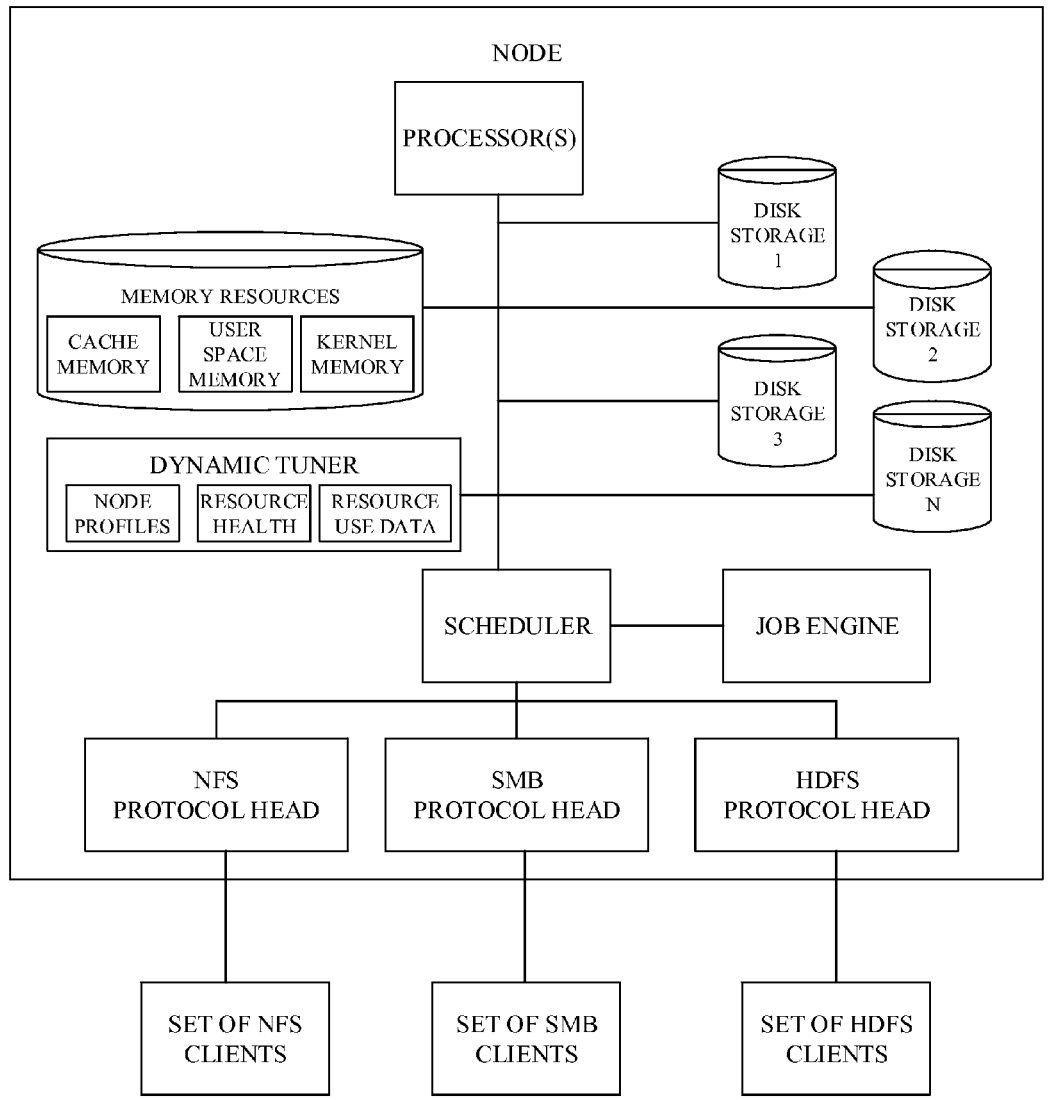
FIG. 1 illustrates an example of a distributed file system node containing components related to dynamic tuning in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Implementations are provided herein for dynamically tuning resource allocation within a node among a cluster of nodes of a distributed file system. Each node can have a plurality of protocol heads that enable the node to communicate with clients using varying protocols. As tasks are received by the node from the client through the protocol head, the amount of work required to perform the task can be estimated, the amount of resources consumed by the task can be estimated, the amount of kernel memory required to perform the task can be estimated, and the amount of general memory required to perform the task can be estimated. Using these estimations, tasks can be scheduled by a scheduler based on the most efficient means to concurrently process as many tasks as possible using available resources of the node. In addition to efficiently scheduling tasks by the scheduler, a dynamic tuner can also reside on the node that can monitor all work executing on the node for each protocol head. The tuner can then distribute and, over time, redistribute resources to each protocol head using real-time data to make adjustments. In addition to tuning resources allocated to the protocol heads, the tuner can also account for pending and scheduled system task activity, as well as account for clients that are attempting to use and/or using more than their fair share of the available node resources.

In one implementation, to determine the total amount of resources available on a node, a hardware profile associated with the node can be established whereby it can be determined how much memory is available for use on the node, how much memory should be available on the node, how much memory should be made available on the node, what differing types of memory are available for use, bandwidth available to move data into and out of memory, how much storage space is available on a set of storage drives, how many processors are available, how many threads can be processed on each processor per clock cycle, etc. In one implementation, a set of known hardware profiles can be established for known node configurations that the distributed file system is known to support. In one implementation, node resources can be determined based on scanning the node. In one implementation, a known hardware profile can be used to determine the baseline performance of a node, and scanning can additionally be used to determine current node health, as it can be appreciated, over time, drive failure, memory failure, or other impacts can be present on the node that changes performance from the original hardware profile.

A node among a cluster of nodes within a distributed file system can provide service to many clients concurrently. In general, there is not set limit of the amount of concurrent clients that can connect to the node as well as the number of requests made by each client. A scheduler can exist on the node that can arrange received requests in an order that allows for more efficient processing of the requests. For example, if a set of processors on a node can execute 6 threads concurrently, and a request received from a client will only take 2 threads to complete, the scheduler can schedule additional requests from other clients to execute concurrently so that all 6 threads are operating at capacity each CPU cycle.

In one example, streaming read requests and/or streaming write operations can be identified and reordered by the scheduler to potentially improve performance. Continuing the example, if subsequent requests received by the scheduler no longer are in order or become random, then the scheduler can stop reordering the packets as there may no longer be efficiencies to gain. In one example, after reordering adjacent streaming read requests and/or adjacent streaming write operations, requests/operations can be coalesced into a single operation for efficiency and performance gain.

In another example, it can be appreciated as sets of requests are scheduled to execute concurrently, the requests will sometimes interfere with each other, in that they may reference the same data blocks, require conflicting amounts of kernel memory resources, require conflicting amounts of user space memory, etc. The scheduler can operate to minimize or negate the amount of concurrently processed operations that unduly clog shared resources and impact system performance.

Each task received by a protocol head can be assessed, prior to being scheduled, for at least, the amount of work required to perform the task can be estimated, the amount of resources consumed by the task can be estimated, the amount of kernel memory required to perform the task can be estimated, and the amount of general memory required to perform the task can be estimated. Limits or a cap be placed on the aggregate amount of use for each of the four areas assessed above. For example, at a node level, a total workload cap, a total resource consumption cap, a total kernel memory consumption cap, and a total user space memory cap can be set based on the hardware profile for the node. The total amount of node resources (e.g., the cap for each resource) can then be divided and assigned to the plurality of protocol heads. For example, in an implementation with three protocol heads, the total amount of resources could be split evenly among the three protocol heads. However, in one implementation, system tasks can also be assigned resources that may limit the amount of resources that can be shared among the protocol heads, as it can be appreciated, system tasks, in general, do not originate from clients but originate from the file system itself.

Referring now to FIG. 1, there is illustrated an example of a distributed file system node containing components related to dynamic tuning in accordance with implementations of this disclosure. In the example, three protocol heads are shown, e.g., one for NFS, one for SMB, and one for the Hadoop Distributed File System ("HDFS"). It can be appreciated that implementations exist for more or less than three protocols and can be designed based on the needs of the file system environment. Each NFS client attempting to connect to the node will interact with the NFS protocol head in making requests to the file system. Similarly, each SMB client will interact with the SMB protocol head.

The scheduler, as discussed above, is the gateway for each of the protocol heads in scheduling the tasks they receive from their clients. Thus, the scheduler has awareness of what processes are currently executing, and a list of pending processes (e.g., outstanding demand). In one implementation, if the demand is higher than the current cap for the protocol head or the node, then the job or process that is pending can be discarded and the client can be instructed to resend the request after a period of delay. It can be appreciated that discard requests should be attempted to be minimized as its not desirable to significantly delay a client's requests and it is further desirable to maintain transparency to the client in how tasks are scheduled. In one implementation, the rate at which client requests are read from the network connection can be throttled. It can be appreciated that by throttling the rate at which client requests are read from the network connection, backpressure on the connection can be induced and can be detected by the client.

Implementations disclosed herein provide for the dynamic tuner to monitor the work executing as scheduled by the scheduler, and the work pending as known by the scheduler, to tune the resources available by each of the protocol heads of the node. For example, in a situation where there are no NFS clients and no HDFS clients yet multiple SMB clients, the dynamic tuner may adjust to provide the maximum amount of resources (e.g., a higher resource cap) to the SMB protocol head. Continuing the example, suppose a new set of HDFS clients then connect to the HDFS protocol head and the scheduler receives a set of pending operations for the HDFS protocol head. The dynamic tuner can be aware of the outstanding demand by the set of HDFS clients and can then dynamically redistribute resources from the SMB protocol head to the HDFS protocol head. It can be appreciated that by assigning resources to each individual protocol head, each protocol head can be guaranteed at least some resources responding to requests made by their associated clients, preventing a situation where a single protocol head has monopolized the scheduler with large amounts of pending operations that must be processed in entirety prior to responding to a newly received request from a different protocol head.

In one implementation, the dynamic tuner can also monitor a job engine of the node to assess system task workflow as well. For example, system tasks, e.g., operating system tasks such as replication, statistic gathering, metadata organization, backup processes, etc. can be queued in sets of jobs within the job engine. Thus, the dynamic tuner can assign some of the node resources for the performance of system tasks, such that the protocol heads don't monopolize all the resources of the node preventing system tasks from having processor time to process. Thus, for example, if the job engine is taking 30% of overall node resources to process systems tasks, then the remaining 70% of node resources can be apportioned to the protocol heads for processing of tasks received by the clients of the protocol heads.

It can be appreciated that the job engine will have a set of tasks to perform, and in some implementations, will load balance based on a naïve thought that all work units are equal. The job engine will commit to perform work as soon as it receives jobs from the scheduler or from other system processes. The scheduler will thus hold the work until appropriate resources are available to process the tasks it has pending from the various protocol heads.

In one implementation, the dynamic tuner can account for drive failure. For example, as shown in FIG. 1, the example node has Disk Storage 1, Disk Storage 2, Disk Storage 3, and Disk Storage "N" (where N is an integer greater than 3). In the event there is drive failure, for example Disk Storage 3 fails and the node is no longer able to store data onto disk storage 3 or read data from disk storage 3, the dynamic tuner can adjust its amount of known resources, as, in the example of disk failure, only three drives remain for concurrent operations versus four prior to failure, potentially impacting the amount of jobs that can be processed concurrently.

Figure 2:
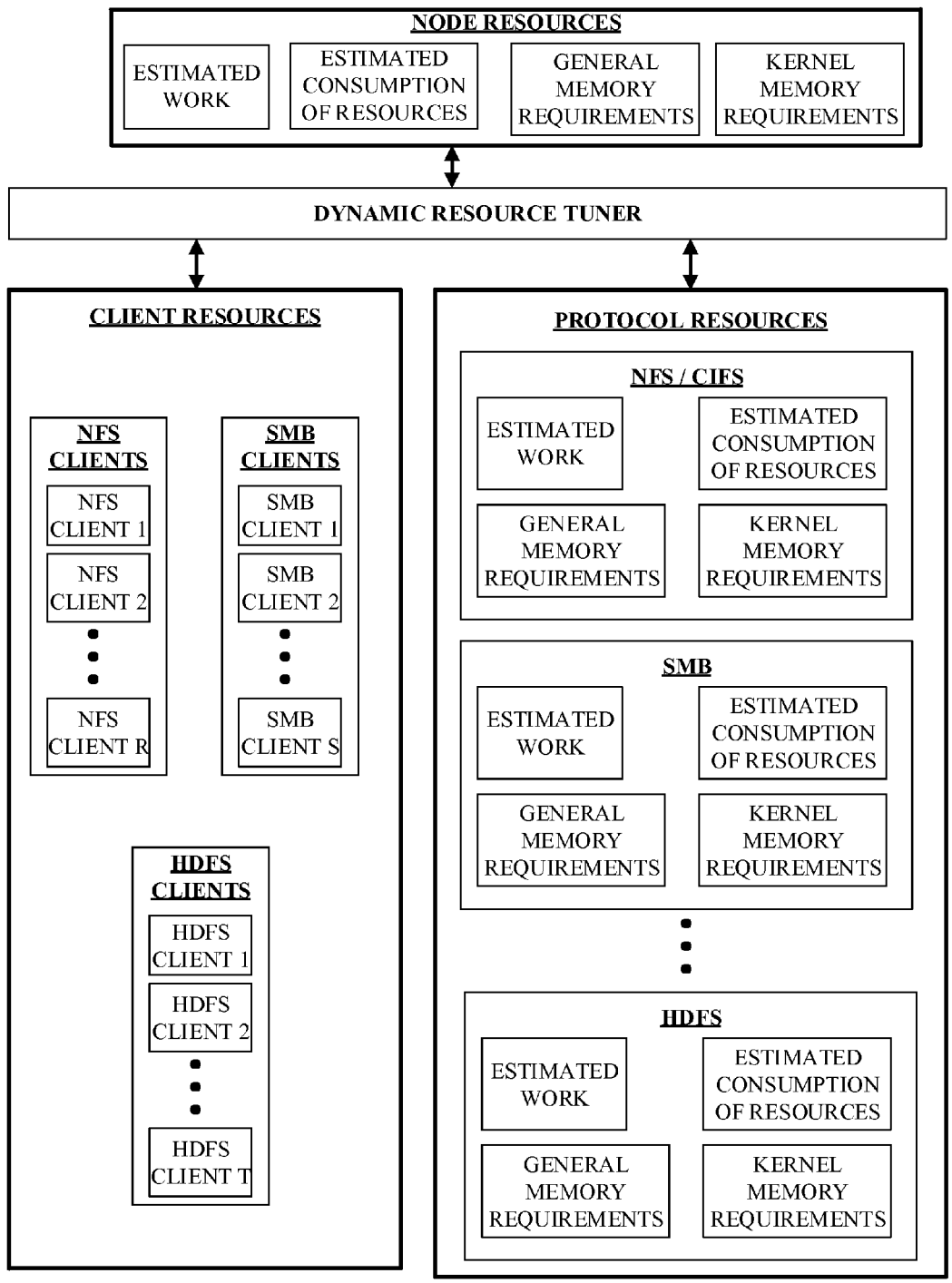
FIG. 2 illustrates an example of layers of tuning in accordance with implementations of this disclosure.

Referring now to FIG. 2, there is illustrated an example of layers of tuning in accordance with implementations of this disclosure. As discussed above, Node resources can be assessed for the amount of estimated work, an estimated consumption of resources, an estimated general memory requirements, and an estimated kernel memory requirements. Portions of the overall amount of node resources can then be assigned to each of the protocol heads, and in one implementation, to system tasks as well.

Client activity of each of the protocol heads can also be monitored and tuned based on the amount of resources assigned to the protocol head of the client. It can be appreciated that a needy client, e.g., a client that is making a disproportionately large amount of work requests over a period of time, can be throttled, such that a single client isn't monopolizing a disproportionate amount of the resources allocated to a protocol head. For example, if all requests received from a set of clients to the protocol head are scheduled as they are received, one client could schedule large amounts of tasks that would then need to be processed prior to any other client's tasks received after the large amount of tasks scheduled by the needy client. Thus, a client can be instructed by the protocol head that the client's request will not continue to be accepted, and that the client needs to slow down the rate of incoming requests. In addition to communicating to the client to reduce the rate at which it is submitting requests to the protocol head, the client's received request can be delayed by the scheduler. In one implementation, the client can be disconnected from the node. In one implementation, a protocol may not support instruction by the protocol head that the client's requests will no longer be accepted and intervention can take place by the scheduler reducing the rate at which the client's requests are scheduled.

Figure 3:
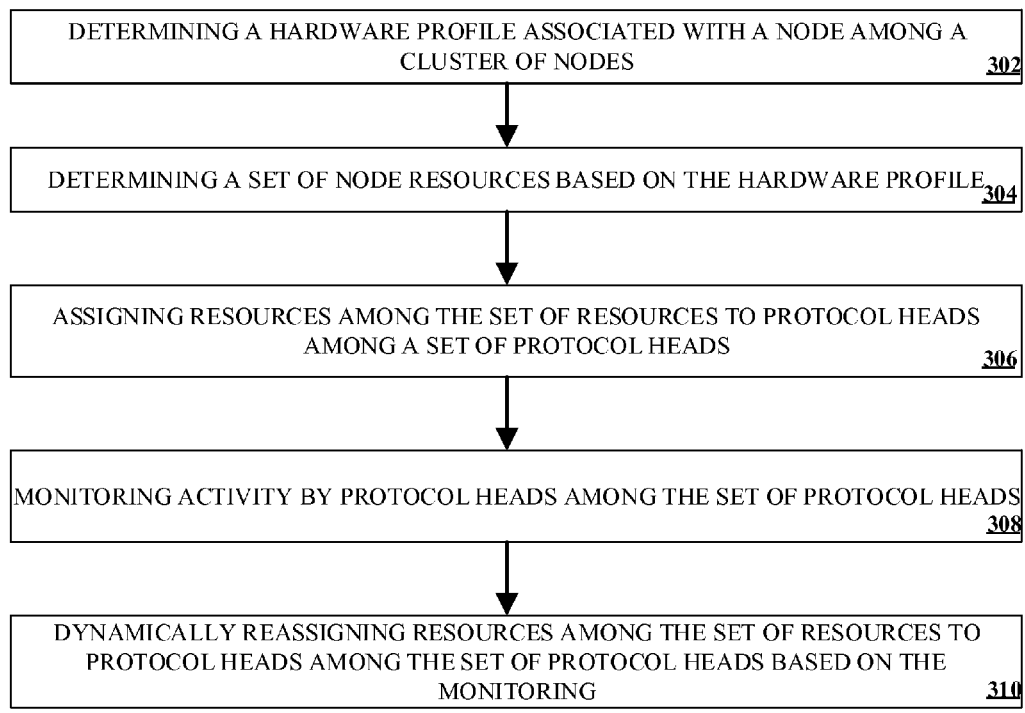
FIG. 3 illustrates an example method for dynamically tuning resource allocation to protocol heads in accordance with implementations of this disclosure.
Figure 4:
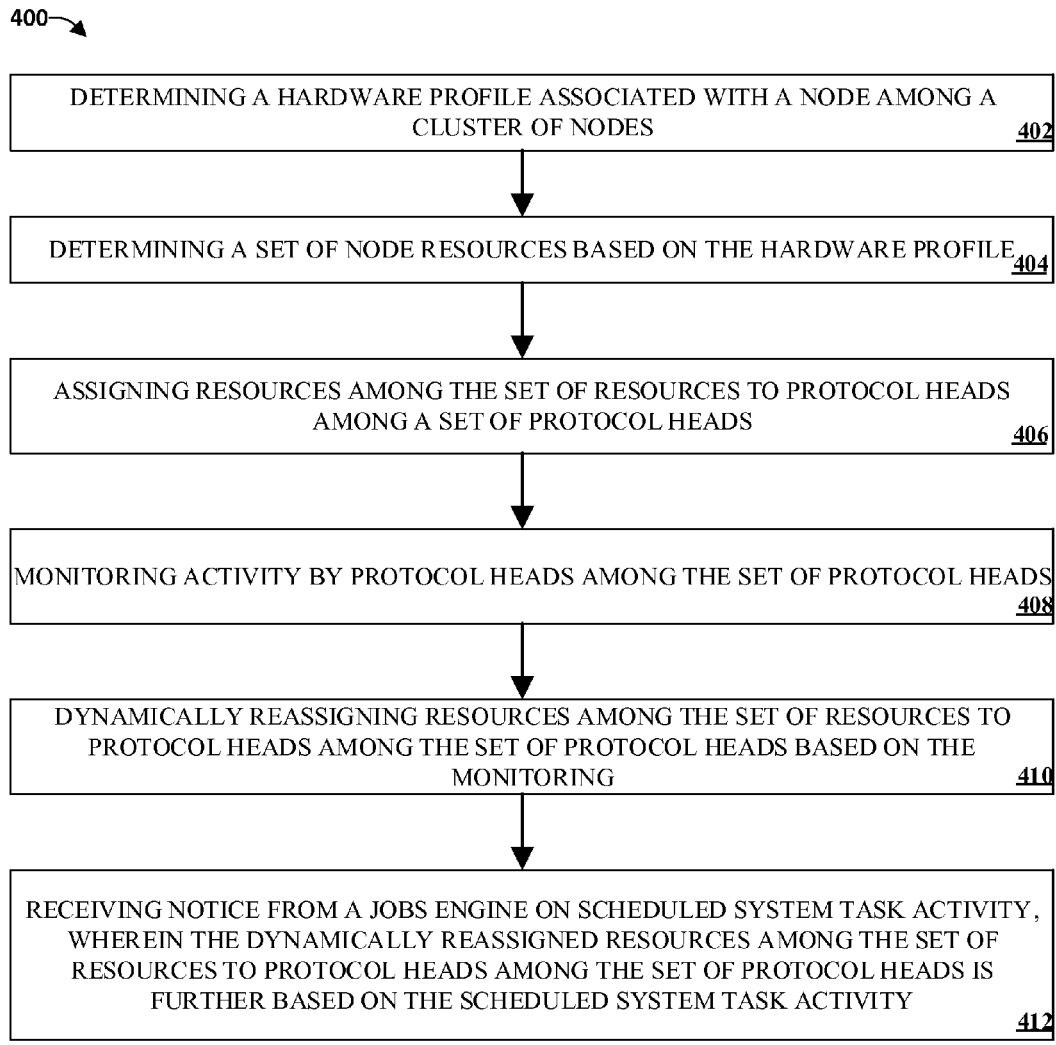
FIG. 4 illustrates an example method for dynamically tuning resource allocation to protocol heads including accounting for system task activity in accordance with implementations of this disclosure.
Figure 5:
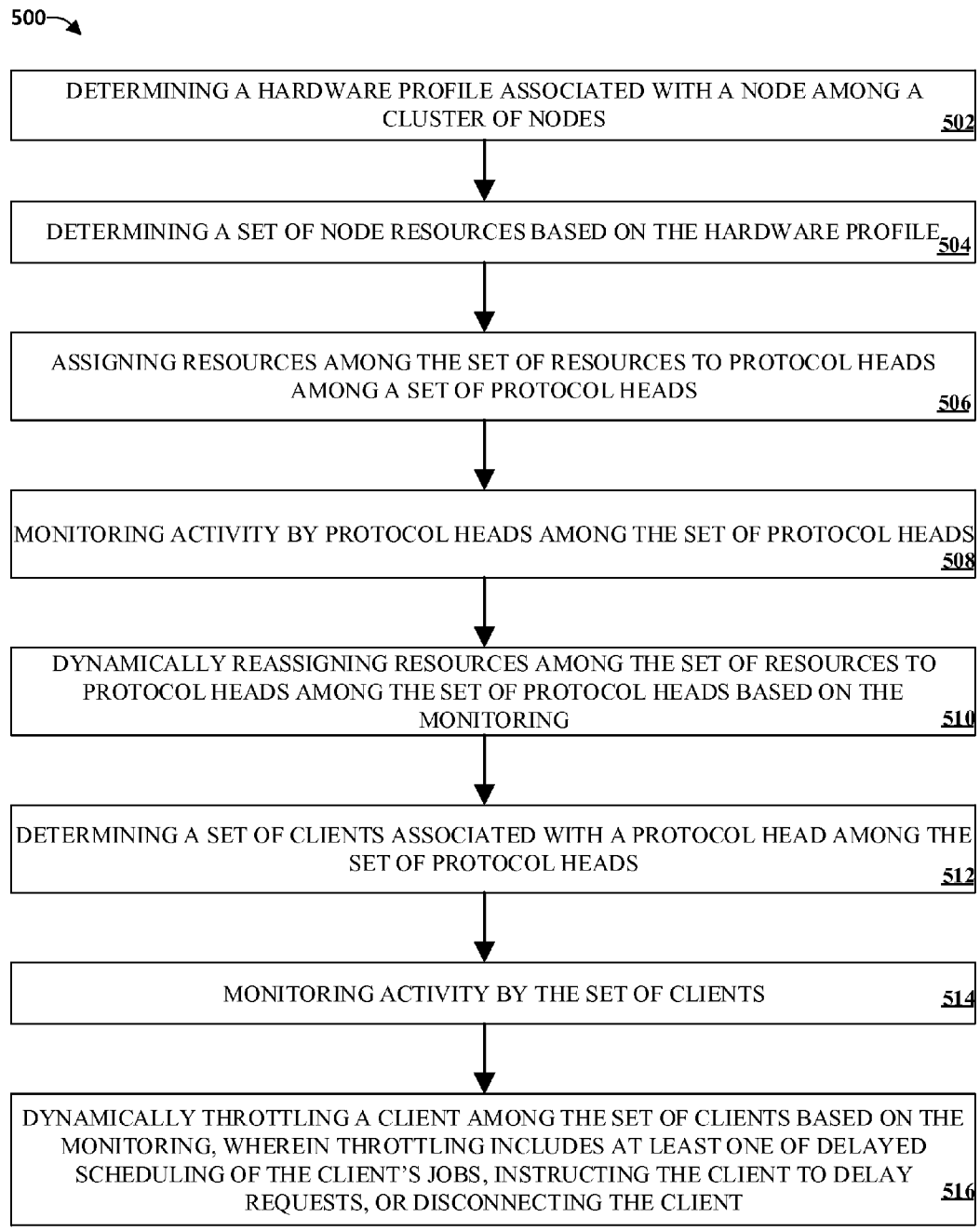
FIG. 5 illustrates an example method for dynamically tuning resource allocation to protocol heads including client throttling in accordance with implementations of this disclosure.

FIGS. 3-5 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 3 illustrates an example method for dynamically tuning resource allocation to protocol heads in accordance with implementations of this disclosure.

At 302, a hardware profile associated with a node among a cluster of nodes can be determined.

At 304, a set of node resources can be determined based on the hardware profile. In one implementation, the set of node resources includes an amount of thread capacity, an amount of kernel memory, and an amount of general memory.

At 306, resources among the set of resources can be assigned to protocol heads among a set of protocol heads. In one implementation, the set of protocol heads includes an NFS protocol head, a SMB protocol head, and an HDFS protocol head.

At 308, activity by the protocol heads among the protocol heads can be monitored.

At 310, resources among the set of resources can be dynamically reassigned to protocol heads among the set of protocol heads based on the monitoring. In one implementation, the dynamically reassigning resources is further based on a node capacity threshold, a kernel memory capacity threshold, a user space memory capacity threshold, and a workload capacity threshold. In one implementation, the dynamic reassigning can be based on a policy established independent of or in conjunction with the monitoring. For example, an administrator may desire to give more resources to a protocol head independent of monitoring. It can be appreciated that an administrator may desire to give more resources to a protocol head or a set of protocol heads even if it means reduced performance for other protocol heads.

FIG. 4 illustrates an example method for dynamically tuning resource allocation to protocol heads including accounting for system task activity in accordance with implementations of this disclosure. Steps 402-410 in FIG. 4 are the same steps as described above with respect to Steps 302-310.

At 412, notice can be received from a jobs engine on scheduled system task activity, wherein the dynamically reassigning resources among the set of resources to protocol heads among the set of protocol heads is further based on the scheduled system task activity.

FIG. 5 illustrates an example method for dynamically tuning resource allocation to protocol heads including client throttling in accordance with implementations of this disclosure. Steps 502-510 in FIG. 5 are the same steps as described above with respect to Steps 302-310.

At 512, a set of client associated with a protocol head among the set of protocol heads can be determined.

At 514, activity by the set of clients can be monitored.

At 516, a client among the set of clients can be dynamically throttled, wherein the throttling includes at least one of delayed scheduling of the client's jobs, instructing the client to delay requests to the node, or disconnecting the client from the node. In one implementation, the dynamically throttling the client is based on the activity associated with the client and a client capacity threshold.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification and last access, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system. It can be further appreciated that a single LIN can have reference data blocks of a file stored/mirrored on different nodes among a cluster of nodes.

Figure 6:
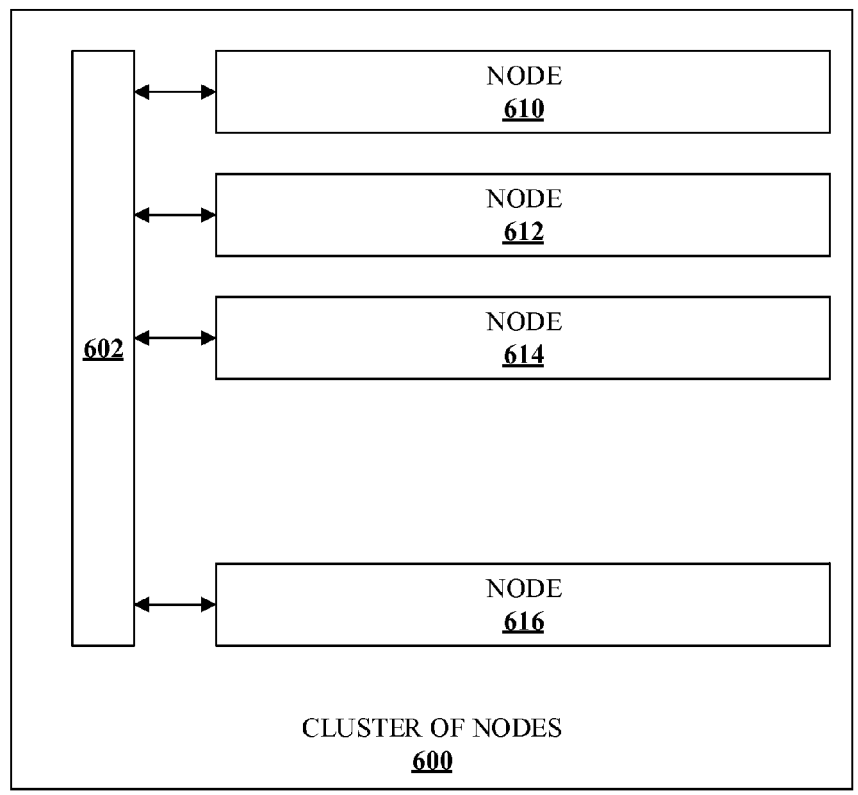
FIG. 6 illustrates an example block diagram of a cluster of nodes in accordance with implementations of this disclosure.

FIG. 6 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces. The cluster of nodes 600 as depicted shows Nodes 610, 612, 614 and 616 operating in a cluster; however, it can be appreciated that more or less nodes can make up a cluster. It can be further appreciated that nodes among the cluster of nodes do not have to be in a same enclosure as shown for ease of explanation in FIG. 6, and can be geographically disparate. Backplane 602 can be any type of commercially available networking infrastructure that allows nodes among the cluster of nodes to communicate amongst each other in as close to real time as the networking infrastructure allows. It can be appreciated that the backplane 602 can also have a separate power supply, logic, I/O, etc. as necessary to support communication amongst nodes of the cluster of nodes.

It can be appreciated that the Cluster of Nodes 600 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 7:
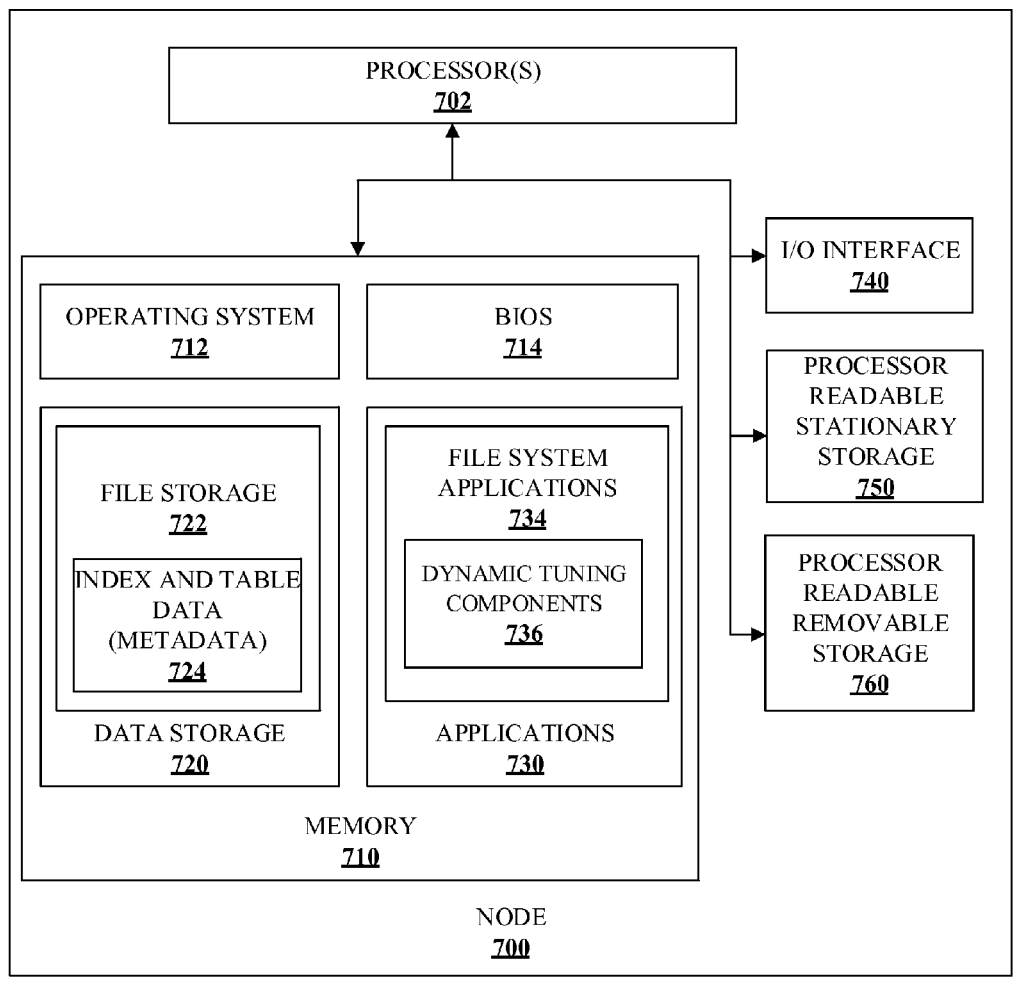
FIG. 7 illustrates an example block diagram of a node in accordance with implementations of this disclosure.

FIG. 7 illustrates an example block diagram of a node 700 in accordance with implementations of this disclosure.

Node 700 includes processor 702 which communicates with memory 710 via a bus. Node 700 also includes input/output interface 740, processor-readable stationary storage device(s) 750, and processor-readable removable storage device(s) 760. Input/output interface 740 can enable node 700 to communicate with other nodes, mobile devices, network devices, and the like. Processor-readable stationary storage device 750 may include one or more devices such as an electromagnetic storage device (hard disk), solid state hard disk (SSD), hybrid of both an SSD and a hard disk, and the like. In some configurations, a node may include many storage devices. Also, processor-readable removable storage device 760 enables processor 702 to read non-transitive storage media for storing and accessing processor-readable instructions, modules, data structures, and other forms of data. The non-transitive storage media may include Flash drives, tape media, floppy media, disc media, and the like.

Memory 710 may include Random Access Memory (RAM), Read-Only Memory (ROM), hybrid of RAM and ROM, and the like. As shown, memory 710 includes operating system 712 and basic input/output system (BIOS) 714 for enabling the operation of node 700. In various embodiments, a general-purpose operating system may be employed such as a version of UNIX, LINUX™, a specialized server operating system such as Microsoft's Windows Server™ and Apple Computer's IoS Server™, or the like.

Applications 730 may include processor executable instructions which, when executed by node 700, transmit, receive, and/or otherwise process messages, audio, video, and enable communication with other networked computing devices. Examples of application programs include database servers, file servers, calendars, transcoders, and so forth. Applications 730 may include, for example, file system applications 734, and dynamic tuning components 736 (including the components as depicted and described with regard to FIG. 1 above) according to implementations of this disclosure. It can be appreciated that the scalable dynamic tuning components 736 can store information in memory 710 such as in a cache or the like as discussed supra.

Human interface components (not pictured), may be remotely associated with node 700, which can enable remote input to and/or output from node 700. For example, information to a display or from a keyboard can be routed through the input/output interface 740 to appropriate peripheral human interface components that are remotely located. Examples of peripheral human interface components include, but are not limited to, an audio interface, a display, keypad, pointing device, touch interface, and the like.

Data storage 720 may reside within memory 710 as well, storing file storage 722 data such as metadata or LIN data.

It can be appreciated that LIN data and/or metadata can relate to rile storage within processor readable stationary storage 750 and/or processor readable removable storage 760. For example, LIN data may be cached in memory 710 for faster or more efficient frequent access versus being stored within processor readable stationary storage 750. In addition, Data storage 720 can also host index and table data 724 such as cursor data in accordance with implementations of this disclosure. Index and table data can be stored as files in file storage 722.

In at least one of the various embodiments, a file may be referenced by an inode that may contain file meta-data, including references, and/or pointers to the file's data blocks. In at least one of the various embodiments, if writers want to write to a file they may need to obtain a lock on the inode to prevent other writers from changing the contents of the inode or readers from fetching the contents of the inode while it is being modified, while a writer is in the middle of a write transaction. In at least one of the various embodiments, the file may be distributed among one or more data storage servers in a distributed data cluster.

In at least one of the various embodiments, a lock manager may be arranged to coordinate the locking protocol between writers or readers and file resources, including the inodes and file data. A lock manager may be part of an operating system 712 or file system. In at least one of the various embodiments, a lock manager manages lock contention among distributed writers or readers within and among distributed nodes of a data cluster. In at least one of the various embodiments, writers or readers of files access the information in an inode by using file system calls, operating system calls, API's, or the like. In at least one of the various embodiments, locking rules may be enforced by a lock manager. A lock manager may enforce the lock rules across a file system that may be implemented on one or more computing devices. A file system may be distributed among multiple data storage nodes and compute nodes.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   determining a hardware profile associated with a node among a cluster of nodes;
   determining a set of node resources based on the hardware profile;
   assigning resources among the set of resources to protocol heads among a set of protocol heads;
   monitoring activity by protocol heads among the set of protocol heads; and
   dynamically reassigning resources among the set of resources to protocol heads among the set of protocol heads based on the monitoring.

2. The method of claim 1, further comprising:
   receiving notice from a jobs engine on scheduled system task activity, wherein the dynamically reassigning resources among the set of resources to protocol heads among the set of protocol heads is further based on the scheduled system task activity.

3. The method of claim 1, wherein the set of node resources includes an amount of thread capacity, an amount of kernel memory, and an amount of general memory.

4. The method of claim 1, wherein the set of protocol heads includes an NFS protocol head, a SMB protocol head, and an HDFS protocol head.

5. The method of claim 1, further comprising:
   determining a set of clients associated with a protocol head among the set of protocol heads;
   monitoring activity by the set of clients;
   dynamically throttling a client among the set of clients based on the monitoring, wherein throttling includes at least one of delayed scheduling of the client's jobs, instructing the client to delay requests to the node, or disconnecting the client from the node.

6. The method of claim 5, wherein the dynamically throttling the client is based on the activity associated with the client and a client capacity threshold.

7. The method of claim 1, wherein the dynamically reassigning resources is further based on a node capacity threshold, a kernel memory capacity threshold, a user space memory capacity threshold, and a workload capacity threshold.

8. A system comprising at least one storage device and at least one hardware processor configured to:
   determine a hardware profile associated with a node among a cluster of nodes;
   determine a set of node resources based on the hardware profile;
   assign resources among the set of resources to protocol heads among a set of protocol heads;

monitor activity by protocol heads among the set of protocol heads; and dynamically reassign resources among the set of resources to protocol heads among the set of protocol heads based on the monitoring.

9. The system of claim 8, further configured to:

receive notice from a jobs engine on scheduled system task activity, wherein the dynamically reassigning resources among the set of resources to protocol heads among the set of protocol heads is further based on the scheduled system task activity.

10. The system of claim 8, wherein the set of node resources includes an amount of thread capacity, an amount of kernel memory, and an amount of general memory.

11. The system of claim 8, wherein the set of protocol heads includes an NFS protocol head, a SMB protocol head, and an HDFS protocol head.

12. The system of claim 8, further configured to:

determine a set of clients associated with a protocol head among the set of protocol heads;

monitor activity by the set of clients;

dynamically throttle a client among the set of clients based on the monitoring, wherein throttling includes at least one of delayed scheduling of the client's jobs, instructing the client to delay requests to the node, or disconnecting the client from the node.

13. The system of claim 12, wherein the dynamically throttling the client is based on the activity associated with the client and a client capacity threshold.

14. The system of claim 8, wherein the dynamically reassigning resources is further based on a node capacity threshold, a kernel memory capacity threshold, a user space memory capacity threshold, and a workload capacity threshold.

15. A computer readable medium with program instructions stored thereon to perform the following acts:

determining a hardware profile associated with a node among a cluster of nodes;

determining a set of node resources based on the hardware profile;

assigning resources among the set of resources to protocol heads among a set of protocol heads;

monitoring activity by protocol heads among the set of protocol heads; and dynamically reassigning resources among the set of resources to protocol heads among the set of protocol heads based on the monitoring.

16. The computer readable medium of claim 15, with program instructions stored thereon to further perform the following acts:

receiving notice from a jobs engine on scheduled system task activity, wherein the dynamically reassigning resources among the set of resources to protocol heads among the set of protocol heads is further based on the scheduled system task activity.

17. The computer readable medium of claim 15, wherein the set of node resources includes an amount of thread capacity, an amount of kernel memory, and an amount of general memory.

18. The computer readable medium of claim 15, with program instructions stored thereon to further perform the following acts:

determining a set of clients associated with a protocol head among the set of protocol heads;

monitoring activity by the set of clients;

dynamically throttling a client among the set of clients based on the monitoring, wherein throttling includes at least one of delayed scheduling of the client's jobs, instructing the client to delay requests to the node, or disconnecting the client from the node.

19. The computer readable medium of claim 18, wherein the dynamically throttling the client is based on the activity associated with the client and a client capacity threshold.

20. The computer readable medium of claim 15, wherein the dynamically reassigning resources is further based on a node capacity threshold, a kernel memory capacity threshold, a user space memory capacity threshold, and a workload capacity threshold.

* * * * *